United States Patent
Keil et al.

(10) Patent No.: US 8,408,569 B2
(45) Date of Patent: Apr. 2, 2013

(54) DAMPER TUBE REINFORCEMENT SLEEVE

(75) Inventors: Daniel T. Keil, Temperance, MI (US); Ben Schaller, Toledo, OH (US); Christopher Conrad, Ann Arbor, MI (US); Laxman Subramaniam, Canton, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 165 days.

(21) Appl. No.: 13/007,718

(22) Filed: Jan. 17, 2011

(65) Prior Publication Data

US 2012/0181766 A1 Jul. 19, 2012

(51) Int. Cl.
*B60G 15/07* (2006.01)
*F16F 9/00* (2006.01)

(52) U.S. Cl. ..... 280/124.154; 188/322.19; 280/124.145; 280/93.512

(58) Field of Classification Search ............... 188/315, 188/322.19; 280/124.1, 124.145–124.147, 280/124.151, 124.154, 124.155, 93.512
See application file for complete search history.

(56) References Cited

U.S. PATENT DOCUMENTS

| | | | | |
|---|---|---|---|---|
| 2,860,733 A * | 11/1958 | Muller | | 188/315 |
| 2,883,181 A * | 4/1959 | Hogan | | 188/289 |
| 3,904,183 A | 9/1975 | Allinquant et al. | | |
| 4,274,654 A * | 6/1981 | Travaglio | | 280/124.154 |
| 4,306,638 A * | 12/1981 | Malott | | 188/322.16 |
| 4,418,938 A * | 12/1983 | Sullivan et al. | | 280/86.753 |
| 4,420,170 A * | 12/1983 | Wysocki | | 280/86.755 |
| 4,441,593 A * | 4/1984 | Axthammer | | 188/322.19 |
| 4,484,670 A * | 11/1984 | Axthammer et al. | | 188/322.19 |
| 4,648,623 A * | 3/1987 | Cameron | | 280/124.155 |
| 4,738,339 A * | 4/1988 | Taylor | | 188/322.19 |
| 5,163,706 A | 11/1992 | Maguran, Jr. et al. | | |
| 5,244,064 A * | 9/1993 | Furuta | | 188/322.19 |
| 6,321,888 B1 * | 11/2001 | Reybrouck et al. | | 188/322.2 |
| 7,314,224 B2 * | 1/2008 | Schuyten | | 280/124.147 |
| 7,988,166 B2 * | 8/2011 | Heeren et al. | | 280/124.154 |
| 8,196,941 B2 * | 6/2012 | Nowak | | 280/124.154 |
| 2008/0197596 A1 | 8/2008 | Heeren et al. | | |
| 2012/0181127 A1 * | 7/2012 | Keil et al. | | 188/297 |

FOREIGN PATENT DOCUMENTS

| | | |
|---|---|---|
| JP | 09-210115 | 8/1997 |
| JP | 2004-232696 | 8/2004 |
| JP | 2005-180673 | 7/2005 |

OTHER PUBLICATIONS

Search Report and Written Opinion dated Jul. 30, 2012 in corresponding PCT Application PCT/US2011/065115.
Search Report and Written Opinion dated Nov. 30, 2012 in corresponding PCT Application No. PCT/US2012/043508.

* cited by examiner

*Primary Examiner* — Paul N Dickson
*Assistant Examiner* — Laura Freedman
(74) *Attorney, Agent, or Firm* — Harness, Dickey & Pierce, P.L.C.

(57) ABSTRACT

A strut assembly includes an upper mount assembly, a shock absorber and a knuckle. The upper mount assembly is attached to a piston rod which is a part of the shock absorber. The knuckle is attached to an outer tube of the shock absorber which can be a reserve tube of a dual-tube shock absorber or a pressure tube of a single tube shock absorber. A reinforcement member increases the strength of the outer tube in the area that interfaces with the knuckle.

19 Claims, 8 Drawing Sheets

DAMPER TUBE REINFORCEMENT SLEEVE

FIELD

The present disclosure relates to corner assemblies for a vehicle's suspension system. More particularly, the present disclosure relates to a shock absorber for the corner assembly which includes a reinforced outer tube in the area that interfaces with the other components of the corner assembly.

BACKGROUND

This section provides background information related to the present disclosure which is not necessarily prior art.

Corner assemblies for suspension systems are well known in the motor vehicle industry. The most common form of a corner assembly for a suspension is the strut suspension system. The strut system includes a coil spring located concentrically around a telescopic strut which is the shock absorber. The upper end of the strut assembly includes an upper mounting assembly which is mounted in a tower formed by the vehicle body at a position above the wheel arch of the vehicle. The lower end of the strut assembly is attached to a knuckle of the wheel assembly. Typically the knuckle includes a clamping mechanism which clamps the outer tube of the shock absorber.

The coil spring is located around the shock absorber and it extends between an upper spring seat which is a part of the top mount assembly for the strut assembly and a lower spring seat which is attached, typically by welding, to the shock absorber of the strut assembly. The outer tube of the shock absorber must be designed strong enough to meet the clamping load requirements for interfacing with the vehicle's knuckle. While the clamped area of the outer tube that interfaces with the knuckle must be designed to withstand the clamping load requirements, the remainder of the outer tube or unclamped area does not have these strength requirements. The strength requirements for the non-clamped area of the outer tube are typically lower than the strength requirements of the clamped portion. Typically, the outer tube of the shock absorber is designed as a constant wall thickness tube. The thickness of the outer tube is designed to meet the clamping load requirements and because the non-clamped portion of the shock absorber does not require the same strength as the clamped portion, the constant wall thickness tube is over designed in the non-clamped portion. This leads to wasted material and excessive costs. While a single piece tube having a variable thickness could be applied to this application, the costs and complications in manufacturing a single piece variable wall thickness tube does not make this an acceptable option.

Other types of corner assemblies include a strut assembly which includes a yoke where the outer tube of the shock absorber is clamped by the yoke which is attached to a lower control arm, a knuckle or another component of the corner assembly. Another type of corner assembly is a dual control arm corner assembly which includes a yoke where the outer tube of the shock absorber is clamped by the yoke which is attached to a lower control arm, a knuckle or another component of the corner assembly. In each of these corner assemblies, the shock absorber is attached to the sprung mass of the vehicle. These corner assemblies have the same issue with regard to the clamping of the outer tube of the shock absorber discussed above for the strut assembly.

SUMMARY

This section provides a general summary of the disclosure, and is not a comprehensive disclosure of its full scope or all of its features.

The present disclosure is directed to a shock absorber having a constant wall thickness outer tube where the thickness of the outer tube is designed to meet the load requirements of the non-clamped portion of the outer tube. In the clamped portion of the tube a reinforcement member is provided. The reinforcement member increases the strength of the outer tube in the clamped portion in order to withstand the clamping load requirements. This system provides a lower cost and lower weight shock absorber which is design optimized to meet the load requirement of both the clamped portion and the non-clamped portion of the outer tube.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
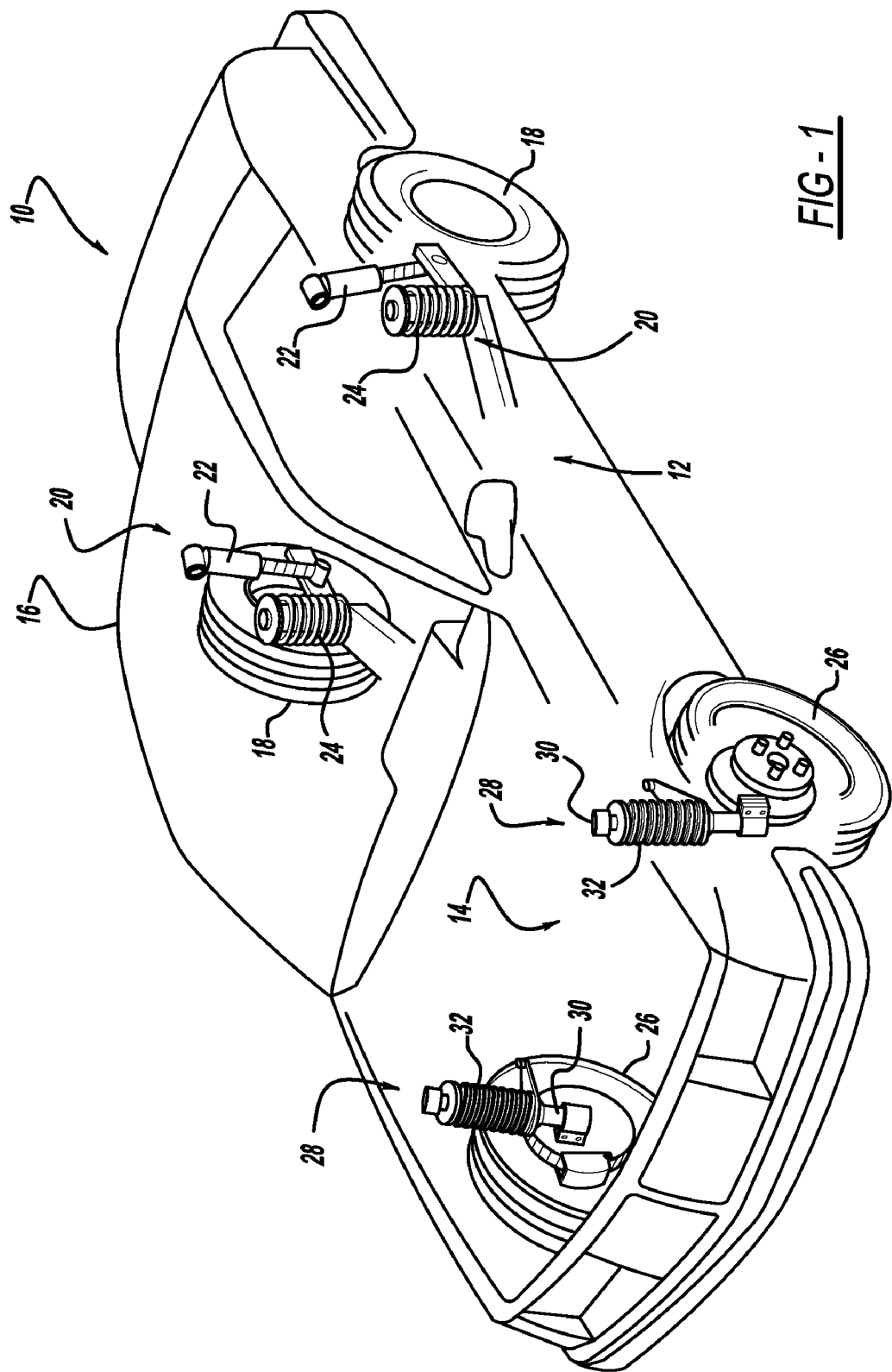
FIG. 1 is an illustration of an automobile using the shock absorber in accordance with the present disclosure.

There is shown in FIG. 1 a vehicle incorporating a suspension system having a corner assembly in accordance with the present disclosure and which is designated generally by the reference numeral 10. Vehicle 10 comprises a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of corner assemblies 20 which include a pair of shock absorbers 22 and a pair of helical coil springs 24. Similarly front suspension 14 includes a transversely extending front axle assembly (not shown) to operatively support the vehicle's front wheels 26. The front axle assembly is operatively connected to body 16 by means of a second pair of corner assemblies 28 which include a pair of shock absorbers 30 and by a pair of shaped helical coil springs 32. Shock absorbers 22 and 30 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 22 and 30 may be used with other types of vehicles and/or in other types of applications such as vehicles incorporating independent front and/or independent rear suspension systems. Further, the term "shock absorber" as used herein is meant to be dampers in general and thus will include struts. Also, while front suspension 14 is illustrated having a pair of struts or shock absorbers 30, it is within the scope of the present invention to have rear suspension 12 incorporate a pair of struts or shock absorbers 30 if desired.

Figure 2:
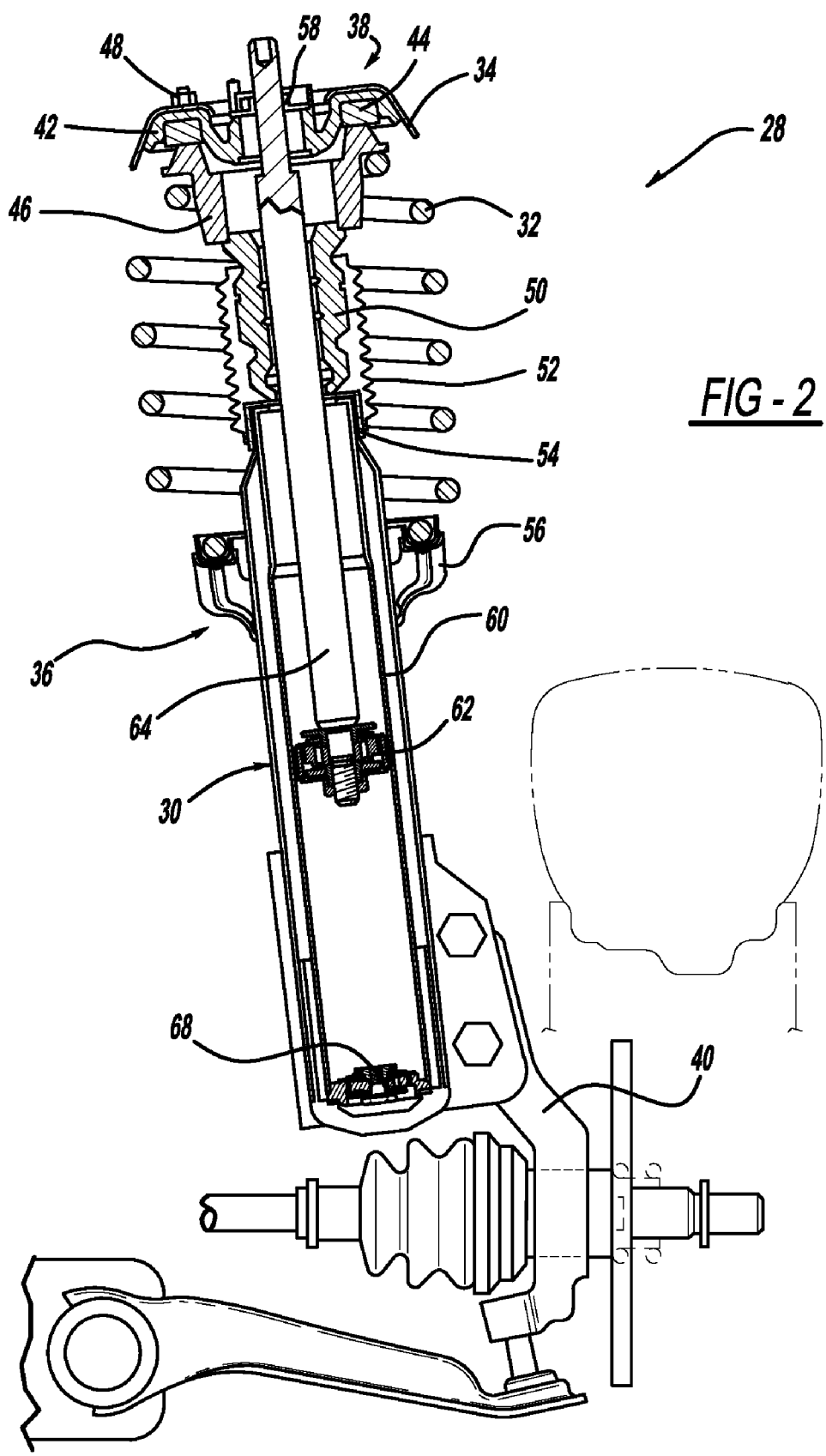
FIG. 2 is a side view of a corner assembly that incorporates the shock absorbers in accordance with the present disclosure.

Referring now to FIG. 2, the front corner assembly 28 for vehicle 10 is illustrated in greater detail. Body 16 defines a shock tower 34 comprising sheet metal of vehicle 10 within which is mounted a strut assembly 36 which comprises a telescoping device in the form of shock absorber 30, coil spring 32, a top mount assembly 38 and a knuckle 40. Strut assembly 36 including shock absorber 30, coil spring 32 and top mount assembly 38 are attached to vehicle 10 using shock tower 34. Top mount assembly 38 comprises a top mount 42, a bearing assembly 44 and an upper spring seat 46. Top mount 42 comprises an integral molded body and a rigid body member, typically made of stamped steel. Top mount assembly 38 is mounted to shock tower 34 by bolts 48. Bearing assembly 44 is friction fit within the molded body of top mount 42 to be seated in top mount 42 so that one side of bearing assembly 44 is fixed relative to top mount 42 and shock tower 34. The second side of bearing assembly 44 freely rotates with respect to the first side of bearing assembly 44, top mount 42 and shock tower 34.

The free rotating side of bearing assembly 44 carries upper spring seat 46 that is clearance fit to the outer diameter of bearing assembly 44. A jounce bumper 50 is disposed between upper spring seat 46 and shock absorber 30. Jounce bumper 50 comprises an elastomeric material which is protected by a plastic dirt shield 52. A bumper cap 54 is located on shock absorber 30 to interface with jounce bumper 50 and plastic dirt shield 52.

A lower spring seat 56 is attached to shock absorber 30 and coil spring 32 is disposed between upper spring seat 46 and lower spring seat 56 to isolate body 16 from front suspension 14. While shock absorber 30 is illustrated in FIG. 2, it is to be understood that shock absorber 22 may also include the features described herein for shock absorber 30.

Prior to the assembly of strut assembly 36 into vehicle 10, the pre-assembly of strut assembly 36 is performed. Bumper cap 54, jounce bumper 50 and plastic dirt shield 52 are assembled to shock absorber 30. Coil spring 32 is assembled over shock absorber 30 and positioned within multi-piece lower spring seat 56. Upper spring seat 46 is assembled onto shock absorber 30 and correctly positioned with respect to coil spring 32. Bearing assembly 44 is positioned on top of upper spring seat 46 and top mount 42 is positioned on top of bearing assembly 44. This entire assembly is positioned within an assembly machine which compresses coil spring 32 such that the end of shock absorber 30 extends through a bore located within top mount assembly 38. A retaining nut 58 is threadingly received on the end of shock absorber 30 to secure the assembly of strut assembly 36.

Top mount 42 is designed as an identical component for the right and left hand sides of the vehicle but it has a different orientation with respect to shock absorber 30 and its associated bracketry when it is placed on the right or left side of the vehicle.

Figure 3:
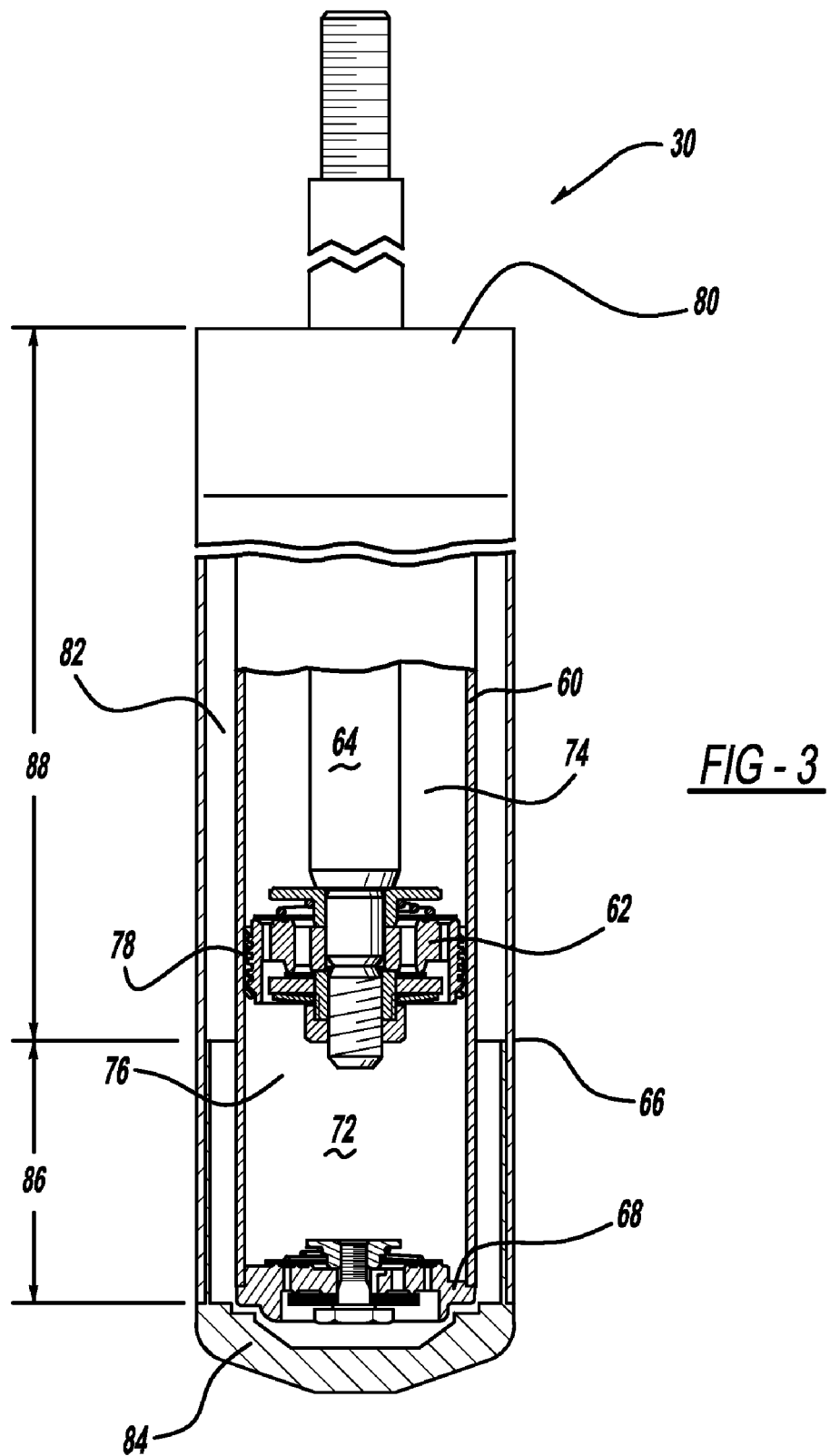
FIG. 3 is a side sectional view of a shock absorber which incorporates the reinforcement of the outer tube in the clamped portion of the outer tube.

Referring now to FIG. 3, shock absorber 30 is shown in greater detail. While FIG. 3 illustrates only shock absorber 30, it is to be understood that shock absorber 22 could also be a part of a strut assembly and include the reinforcement described below for shock absorber 30. Shock absorber 30 comprises a pressure tube 60, a piston assembly 62, a piston rod 64, a reserve tube assembly 66 and a base valve assembly 68.

Pressure tube 60 defines a working chamber 72. Piston assembly 62 is slidably disposed within pressure tube 60 and divides working chamber 72 into an upper working chamber 74 and a lower working chamber 76. A seal 78 is disposed between piston assembly 62 and pressure tube 60 to permit sliding movement of piston assembly 62 with respect to pressure tube 60 without generating undue frictional forces as well as sealing upper working chamber 74 from lower working chamber 76. Piston rod 64 is attached to piston assembly 62 and extends through upper working chamber 74 and through an upper end cap 80 which closes the upper end of pressure tube 60. A sealing system seals the interface between upper end cap 80, reserve tube assembly 66 and piston rod 64. The end of piston rod 64 opposite to piston assembly 62 is adapted to be secured to top mount assembly 38 and to the sprung portion of vehicle 10 as discussed above. Valving within piston assembly 62 controls the movement of fluid between upper working chamber 74 and lower working chamber 76 during movement of piston assembly 62 within pressure tube 60. Because piston rod 64 extends only through upper working chamber 74 and not lower working chamber 76, movement of piston assembly 62 with respect to pressure tube 60 causes a difference in the amount of fluid displaced in upper working chamber 74 and the amount of fluid displaced in lower working chamber 76. The difference in the amount of fluid displaced is known as the "rod volume" and it flows through base valve assembly 68.

Reserve tube assembly 66 surrounds pressure tube 60 to define a fluid reservoir chamber 82 located between pressure tube 60 and reserve tube assembly 66. The bottom end of reserve tube assembly 66 is closed by an end cap 84. While end cap 84 is illustrated as a separate component, it is within the scope of the present disclosure to have end cap 84 integral with reserve tube assembly 66. The upper end of reserve tube assembly 66 is attached to upper end cap 80. The lower end of reserve tube assembly 66 defines a reinforced portion 86 which interfaces with knuckle 40. The remaining length of reserve tube assembly 66 defines a non-reinforced portion 88. Base valve assembly 68 is disposed between lower working chamber 76 and reservoir chamber 82 to control the flow of fluid between chambers 76 and 82. When shock absorber 30 extends in length, an additional volume of fluid is needed in lower working chamber 76 due to the "rod volume" concept. Thus, fluid will flow from reservoir chamber 82 to lower working chamber 76 through base valve assembly 68 as detailed below. When shock absorber 30 compresses in length, an excess of fluid must be removed from lower working chamber 76 due to the "rod volume" concept. Thus, fluid will flow from lower working chamber 76 to reservoir chamber 82 through base valve assembly 68 as detailed below.

Figure 4:
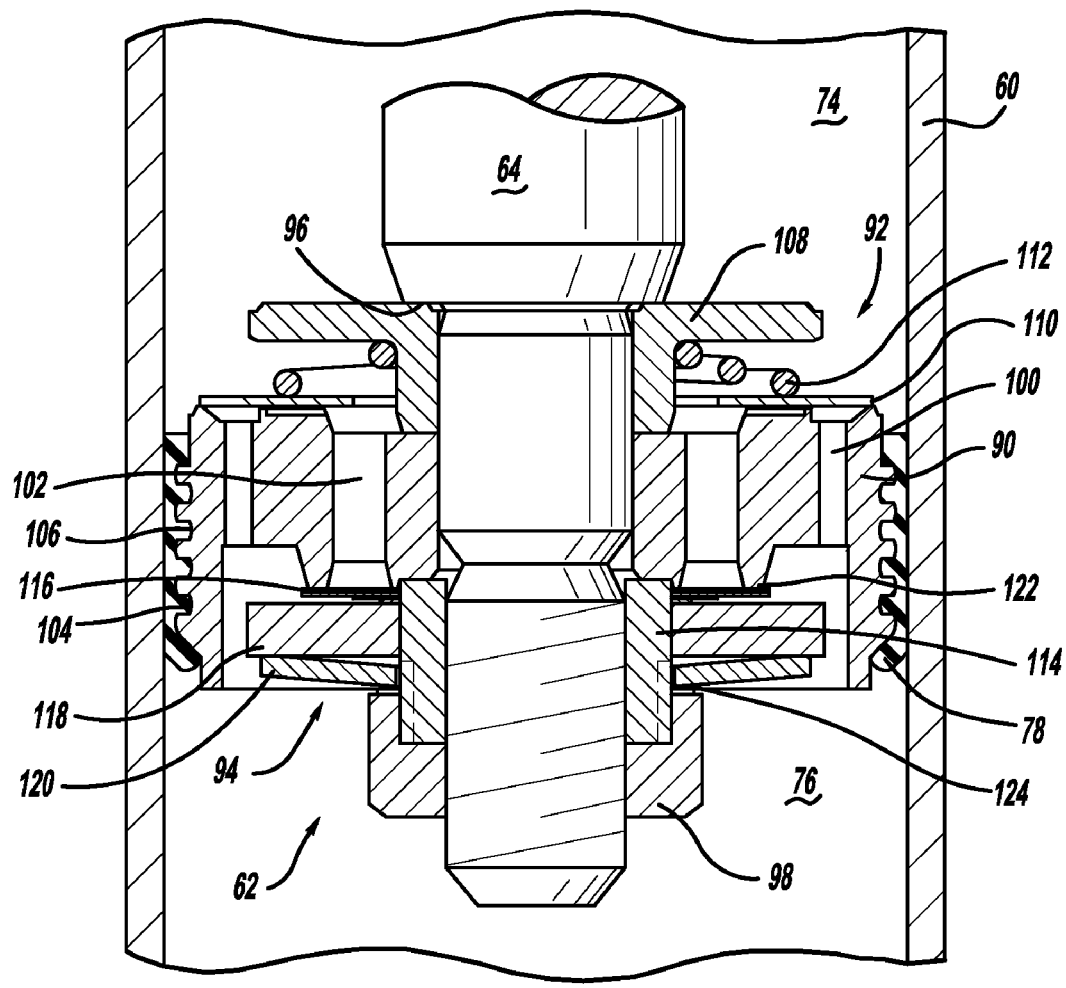
FIG. 4 is an enlarged side view, partially in cross-section, of the piston assembly from the shock absorber illustrated in FIG. 3.

Referring now to FIG. 4, piston assembly 62 comprises a piston body 90, a compression valve assembly 92 and a rebound valve assembly 94. Compression valve assembly 92 is assembled against a shoulder 96 on piston rod 64. Piston body 90 is assembled against compression valve assembly 92 and rebound valve assembly 94 is assembled against piston body 90. A nut 98 secures these components to piston rod 64.

Piston body 90 defines a plurality of compression passages 100 and a plurality of rebound passages 102. Seal 78 includes a plurality of ribs 104 which mate with a plurality of annular grooves 106 to restrict sliding movement of seal 78 relative to piston body 90 as piston assembly 62 slides in pressure tube 60.

Compression valve assembly 92 comprises a retainer 108, a valve disc 110 and a spring 112. Retainer 108 abuts shoulder 96 on one end and piston body 90 on the other end. Valve disc 110 abuts piston body 90 and closes compression passages 100 while leaving rebound passages 102 open. Spring 112 is disposed between retainer 108 and valve disc 110 to bias valve disc 110 against piston body 90. During a compression stroke, fluid in lower working chamber 76 is pressurized causing fluid pressure to react against valve disc 110. When the fluid pressure against valve disc 110 overcomes the biasing load of spring 112, valve disc 110 separates from piston body 90 to open compression passages 100 and allow fluid flow from lower working chamber 76 to upper working chamber 74. The damping characteristics for shock absorber 30 during a compression stroke of shock absorber 30 can be controlled by compression valve assembly 92 and/or base valve assembly 68 which accommodates the flow of fluid from lower working chamber 76 to reservoir chamber 82 due to the "rod volume" concept as detailed below. During a rebound stroke, compression passages 100 are closed by valve disc 110.

Rebound valve assembly 94 comprises a spacer 114, a plurality of valve discs 116, a retainer 118 and a spring 120. Spacer 114 is threadingly received on piston rod 64 and is disposed between piston body 90 and nut 98. Spacer 114 retains piston body 90 and compression valve assembly 92 while permitting the tightening of nut 98 without compressing either valve disc 110 or valve discs 116. Retainer 108, piston body 90 and spacer 114 provide a continuous solid connection between shoulder 96 and nut 98 to facilitate the tightening and securing of nut 98 to spacer 114 and thus to piston rod 64. Valve discs 116 are slidingly received on spacer 114 and abut piston body 90 to close rebound passages 102 while leaving compression passages 100 open. Retainer 118 is also slidingly received on spacer 114 and it abuts valve discs 116. Spring 120 is assembled over spacer 114 and is disposed between retainer 118 and nut 98 which is threadingly received on spacer 114. Spring 120 biases retainer 118 against valve discs 116 and valve discs 116 against piston body 90. Valve discs 116 includes at least one slot 122 which permits a limited amount of bleed flow bypassing rebound valve assembly 94. When fluid pressure is applied to valve discs 116, they will elastically deflect at the outer peripheral edge to open rebound valve assembly 94. A shim 124 is located between nut 98 and spring 120 to control the preload for spring 120 and thus the blow off pressure as described below. Thus, the calibration for the blow off feature of rebound valve assembly 94 is separate from the calibration for compression valve assembly 92.

During a rebound stroke, fluid in upper working chamber 74 is pressurized causing fluid pressure to react against valve discs 116. When the fluid pressure reacting against valve discs 116 overcomes the bending load for valve discs 116, valve discs 116 elastically deflect opening rebound passages 102 allowing fluid flow from upper working chamber 74 to lower working chamber 76. The strength of valve discs 116 and the size of rebound passages 102 will determine the damping characteristics for shock absorber 30 in rebound. Prior to the deflection of valve discs 116, a controlled amount of fluid flows from upper working chamber 74 to lower working chamber 76 through slot 122 to provide low speed tunability. When the fluid pressure within upper working chamber 74 reaches a predetermined level, the fluid pressure will overcome the biasing load of spring 120 causing axial movement of retainer 118 and the plurality of valve discs 116. The axial movement of retainer 118 and valve discs 116 fully opens rebound passages 102 thus allowing the passage of a significant amount of damping fluid creating a blowing off of the fluid pressure which is required to prevent damage to shock absorber 30 and/or vehicle 10. Additional fluid required to be added to lower working chamber 76 due to the "rod volume" concept will flow through base valve assembly 68.

Figure 5:
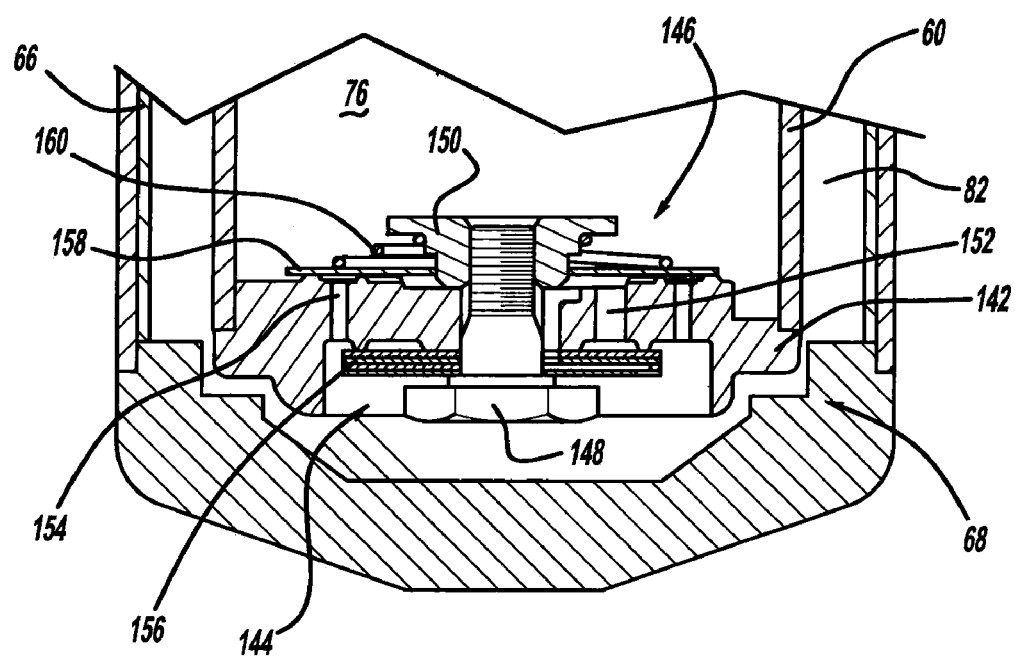
FIG. 5 is an enlarged side view, partially in cross-section of the base valve assembly from the shock absorber illustrated in FIG. 3.

Referring to FIG. 5, base valve assembly 68 comprises a valve body 142, a compression valve assembly 144 and a rebound valve assembly 146. Compression valve assembly 144 and rebound valve assembly 146 are attached to valve body 142 using a bolt 148 and a nut 150. The tightening of nut 150 biases compression valve assembly 144 towards valve body 142. Valve body 142 defines a plurality of compression passages 152 and a plurality of rebound passages 154.

Compression valve assembly 144 comprises a plurality of valve discs 156 that are biased against valve body 142 by bolt 148 and nut 150. During a compression stroke, fluid in lower working chamber 76 is pressurized and the fluid pressure within compression passages 152 will eventually open compression valve assembly 144 by deflecting valve discs 156. Compression valve assembly 92 of piston assembly 62 will allow fluid flow from lower working chamber 76 to upper working chamber 74 and only the "rod volume" will flow through compression valve assembly 144. The damping characteristics for shock absorber 30 are determined by the design of compression valve assembly 144 of base valve assembly 68 and can also be determined by compression valve assembly 92.

Rebound valve assembly 146 comprises a valve disc 158 and a valve spring 160. Valve disc 158 abuts valve body 142 and closes rebound passages 154. Valve spring 160 is disposed between nut 150 and valve disc 158 to bias valve disc 158 against valve body 142. During a rebound stroke, fluid in lower working chamber 76 is reduced in pressure causing fluid pressure in reservoir chamber 82 to react against valve disc 158. When the fluid pressure against valve disc 158 overcomes the biasing load of valve spring 160, valve disc 158 separates from valve body 142 to open rebound passages 154 and allow fluid flow from reservoir chamber 82 to lower working chamber 76. The damping characteristics for a rebound stroke can be controlled by rebound valve assembly 94 as detailed above and can also be controlled by rebound valve assembly 146.

Figure 6:
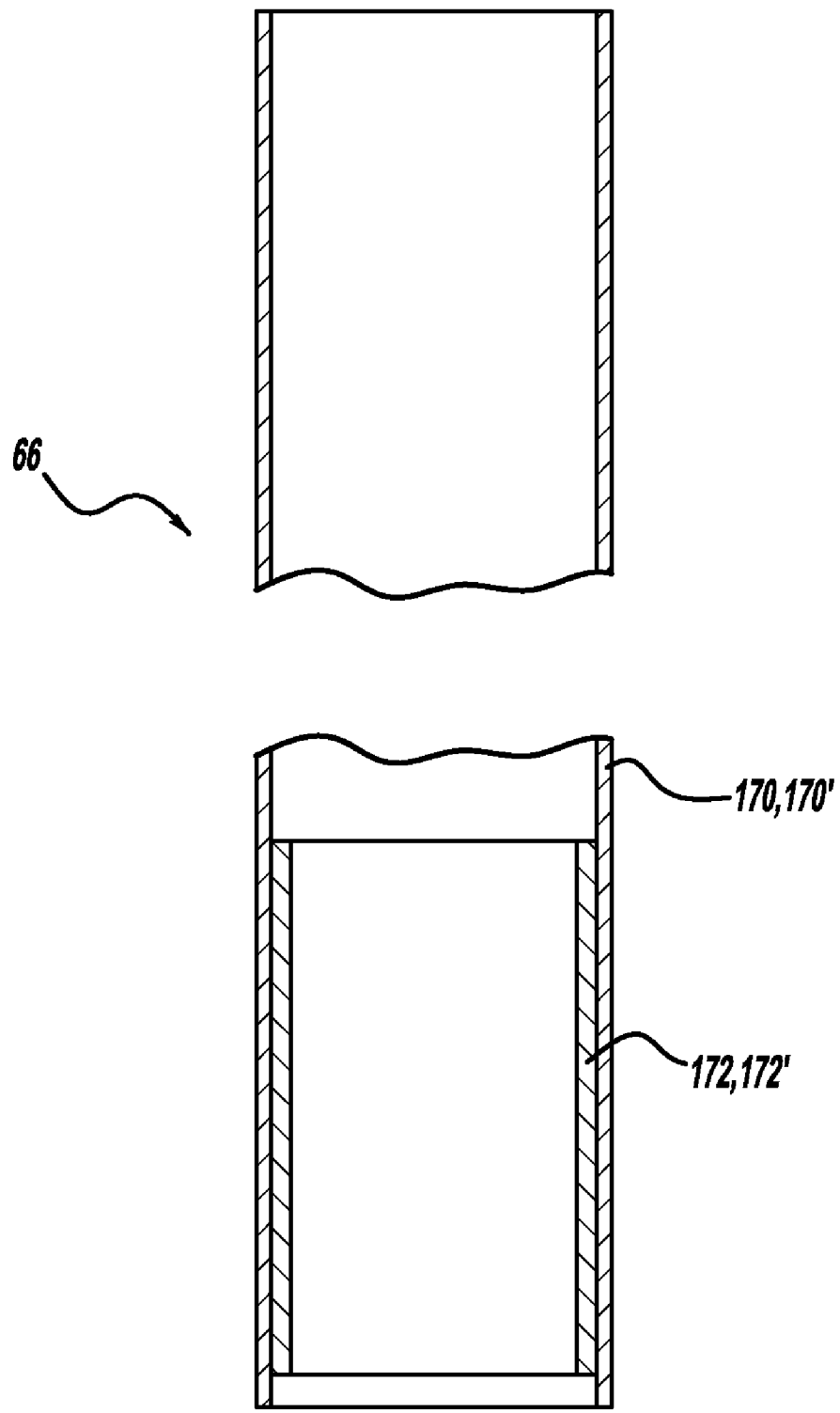
FIG. 6 is an enlarged cross-section of the clamped portion of the shock absorber in FIG. 3.

Referring now to FIG. 6, reserve tube assembly 66 is illustrated in greater detail. Reserve tube assembly 66 includes a reserve tube 170 and a reinforcement member 172 in the form of an internal tube. Preferably reinforcement member 172 is a steel tube but any material which can provide the required strength can be used. Reserve tube assembly 66 extends from end cap 84 to upper end cap 80 to define reservoir chamber 82. Reinforcement member 172 is disposed within reservoir chamber 82. Reinforcement member 172 extends from the end of reserve tube 170 to a position which is at or near the upper end of the clamping portion of knuckle 40 (FIG. 2) which is a part of strut assembly 36. Reinforcement member 172 increases the strength of the lower reinforced portion 86 of reserve tube 170 such that it can accept the clamping loads from a clamping member such as knuckle 40 and any bending loads caused by the movement of shock assembly 30. The reinforcement of the lower reinforced portion 86 of reserve tube 170 allows for the upper non-reinforced portion 88 of reserve tube 170 to be designed as a thinner tube since the load requirements for shock absorber 30 in the non-reinforced portion 88 are lower than the load requirements for shock absorber 30 in the reinforced portion 86. The length and thickness of reinforcement member 172 will be determined by both the clamping loads and the bending loads that shock absorber 30 is required to withstand.

Figure 7:
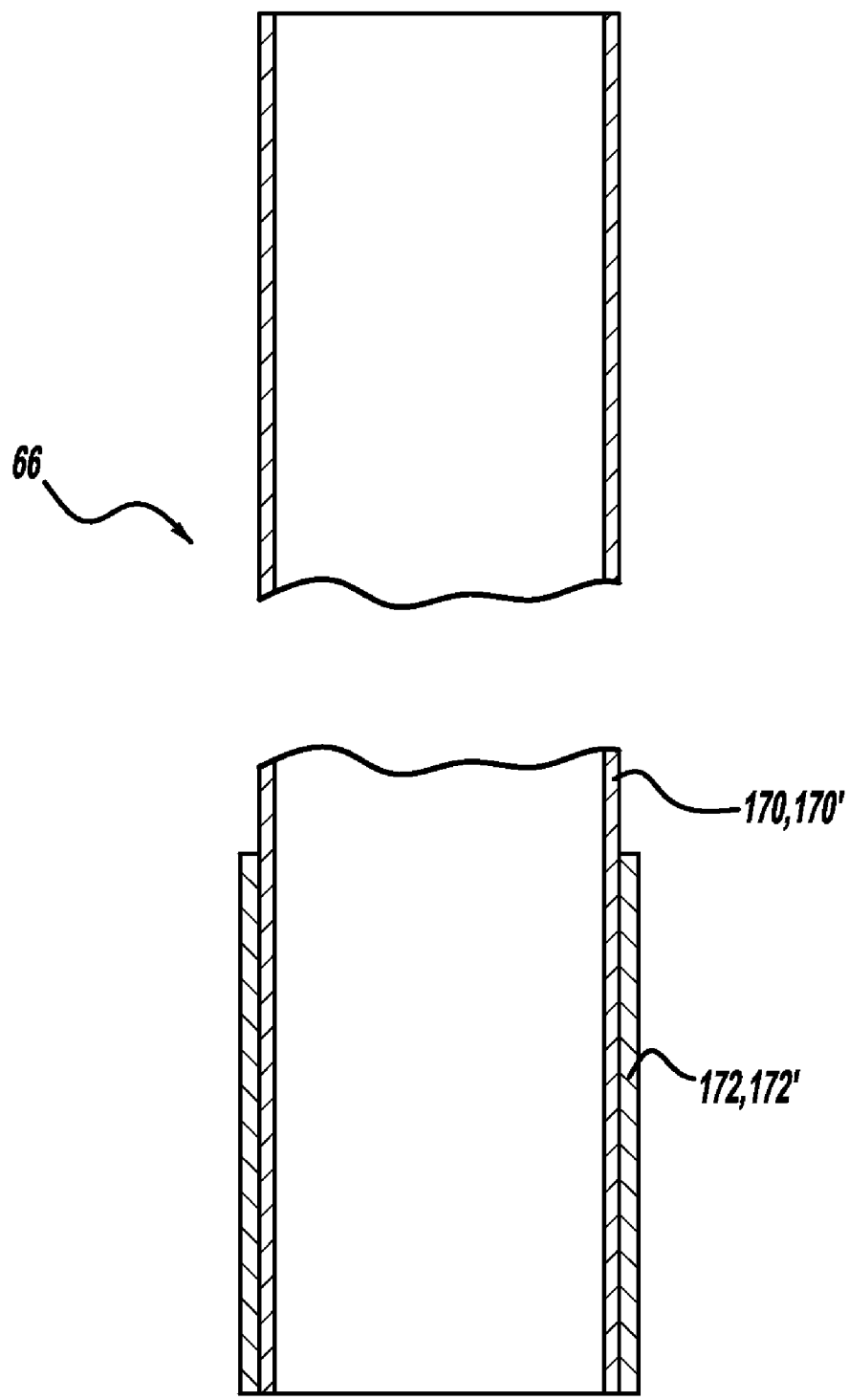
FIG. 7 is an enlarged cross-section of the clamped portion of a shock absorber in accordance with another embodiment of the present invention.

While reinforcement member 172 is illustrated as being on the internal surface of reserve tube 170, it is within the scope of the present invention to have reinforcement member 172 positioned on the outside surface or over reserve tube 170 as illustrated in FIG. 7. Also, while reinforcement member 172 is illustrated in conjunction with a dual tube shock absorber, it is within the scope of the present invention to use a reinforcement member 172' with a single tube shock absorber where it would increase the strength of the reinforced portion of a pressure tube 170' of the monotube shock absorber. When used with a monotube shock absorber, it is preferred to locate reinforcement member 172' on the outside of the pressure tube in order to allow the piston to travel into the reinforced portion of the pressure tube. Thus, FIGS. 6 and 7 also illustrate pressure tube 170' and reinforcement member 172'.

Figure 8:
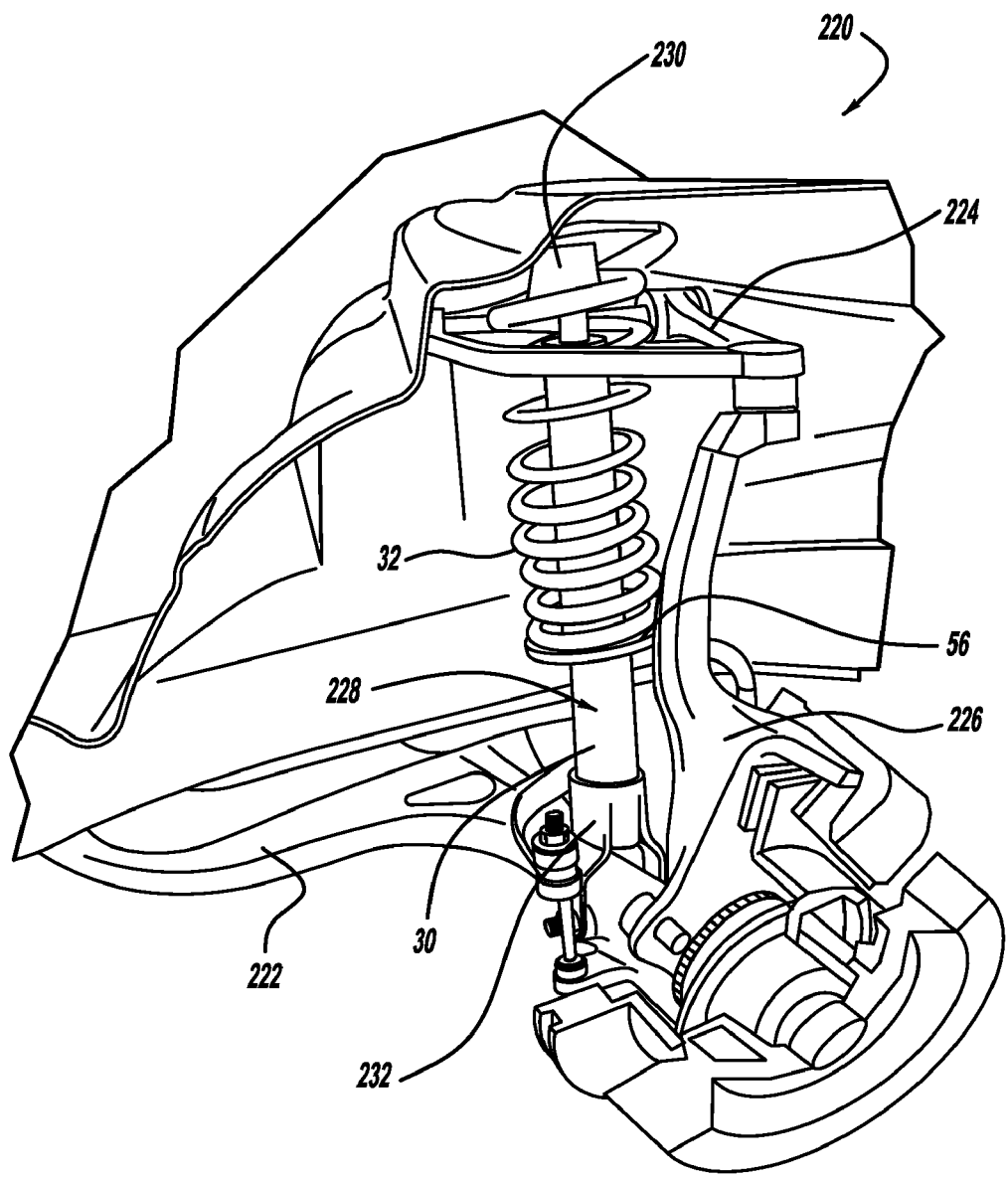
FIG. 8 is a side view of a corner assembly in accordance with another embodiment of the present invention incorporating the shock absorber of the present disclosure.

Referring now to FIG. 8, a corner assembly 220 in accordance with the present disclosure is illustrated. Corner assembly 220 can replace either of or both of corner assemblies 20 and 28. Corner assembly 220 includes a lower control arm assembly 222, an upper control arm assembly 224, a knuckle assembly 226, and a shock absorber assembly 228.

Lower control arm assembly 222 is attached to the sprung portion of vehicle 10 at one end and is attached to shock absorber assembly 228 and knuckle assembly 226 at the opposite end. Upper control arm assembly 224 is attached to the sprung portion of vehicle 10 at one end and is attached to knuckle assembly 226 at the opposite end. Shock absorber assembly 228 is connected at one end to lower control arm assembly 222 and knuckle assembly 226 and its opposite end is attached to a top mount assembly 230 defined by the sprung portion of vehicle 10.

Shock absorber assembly 228 includes a yoke 232, shock absorber 30 and coil spring 32. Shock absorber 30 is disposed within and is clamped by yoke 232. Lower spring seat 56 is attached to shock absorber 30 and coil spring 32 is disposed between top mount assembly 230 and lower spring seat 56 to isolate body 16 from front suspension 14. Shock absorber 30 is described in detail above and will not be described here.

Reinforcement member 172 of reserve tube assembly 66 extends from the end or reserve tube 170 of reserve tube assembly 66 to a position that is at or near the upper end of the clamping portion of yoke 232. Reinforcement member 172 increases the strength of the lower reinforced portion 86 of reserve tube 170 such that it can accept the clamping loads from a clamping member such as yoke 232 and bending loads caused by the movement of corner assembly 220. The reinforcing of the lower reinforced portion 86 of reserve tube 170 allows for the upper non-reinforced portion 88 of reserve tube 170 to be designed as a thinner tube since the load requirements for shock absorber 30 in the reinforced portion 86 are lower than the load requirements for shock absorber 30 in the non-reinforced portion 88. The length and thickness of reinforcement member 172 will be determined by both the clamping loads and the bending loads that shock absorber 30 is required to withstand.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A corner assembly comprising:
   a top mount assembly;
   a shock absorber attached to said top mount assembly; and
   a clamping member attached to said shock absorber, said clamping member defining a length of engagement between said clamping member and said shock absorber; wherein
   said shock absorber comprises an outer tube assembly, said outer tube assembly including an outer tube and a reinforcement member;
   said reinforcement member being entirely disposed within said length of engagement between said clamping member and said shock absorber; and
   said reinforcement member engaging said outer tube along an entire length of said reinforcement member.

2. The corner assembly according to claim 1, wherein said reinforcement member is a tubular component.

3. The corner assembly according to claim 2, wherein said tubular component is disposed within a reinforced portion of said outer tube, and said shock absorber is attached to said clamping member in said reinforced portion of said outer tube.

4. The corner assembly according to claim 1, wherein said reinforcement member is disposed within a reinforced portion of said outer tube, and said shock absorber is attached to said clamping member in said reinforced portion of said outer tube.

5. The corner assembly according to claim 1, wherein said outer tube is a reserve tube of said shock absorber.

6. The corner assembly according to claim 1, wherein said reinforcement member is disposed within said outer tube.

7. The corner assembly according to claim 1, wherein said outer tube is disposed within said reinforcement member.

8. The corner assembly according to claim 1, wherein said reinforcement member extends from a position immediately adjacent an end of said outer tube to a position within said length of engagement between said clamping member and said shock absorber.

9. A corner assembly comprising:
   an outer tube;
   a clamping member attached to said outer tube, said clamping member defining a length of engagement between said clamping member and said outer tube;
   a piston assembly disposed within said outer tube;
   a piston rod attached to said piston assembly, said piston rod extending through one end of said outer tube; and
   a reinforcement member disposed at one end of said outer tube; wherein
   said reinforcement member being entirely disposed within said length of engagement between said clamping member and said outer tube; and
   said reinforcement member engaging said outer tube along an entire length of said reinforcement member.

10. The corner assembly according to claim 9, further comprising:
    a pressure tube disposed within said outer tube, said piston assembly slidingly engaging an internal surface of said pressure tube.

11. The corner assembly according to claim 9, wherein said reinforcement member is a tubular component.

12. The corner assembly according to claim 11, further comprising a clamping member attached to said outer tube, said tubular component being disposed within a reinforced portion of said outer tube, said clamping member being attached to said outer tube in said reinforced portion of said outer tube.

13. The corner assembly according to claim 9, further comprising a clamping member attached to said outer tube, said reinforcement member being disposed within a reinforced portion of said outer tube, said clamping member being attached to said outer tube in said reinforced portion of said outer tube.

14. The corner assembly according to claim 9, wherein said reinforcement member is disposed within said outer tube.

15. The corner assembly according to claim 9, wherein said outer tube is disposed within said reinforcement member.

16. The corner assembly according to claim 9, further comprising:
    a clamping member attached to said outer tube; and
    a top mount assembly attached to said piston rod.

17. The strut assembly according to claim 9, further comprising:
    a top mount assembly attached to said piston rod, said top mount assembly including an upper spring seat;
    a lower spring seat attached to said outer tube; and
    a spring disposed between said upper and lower spring seats.

18. The strut assembly according to claim 17, further comprising a clamping member attached to said outer tube.

19. The corner assembly according to claim 9, wherein said reinforcement member extends from a position immediately adjacent an end of said outer tube to a position within said length of engagement between said clamping member and said outer tube.

\* \* \* \* \*